United States Patent [19]

Bradley et al.

[11] Patent Number: 4,649,950
[45] Date of Patent: Mar. 17, 1987

[54] FUEL NOZZLE ASSEMBLY WITH INTEGRAL VALVE ASSEMBLY AND INLET WASH FILTER AND PRIMARY FUEL TAKE-OFF

[75] Inventors: Jerome R. Bradley, Sterling Heights; Robert M. Halvorsen, Birmingham; Gregory F. Long, Canton, all of Mich.

[73] Assignee: Ex-Cell-O Corporation, Troy, Mich.

[21] Appl. No.: 802,149

[22] Filed: Nov. 27, 1985

[51] Int. Cl.$^4$ .............................................. B01D 35/02
[52] U.S. Cl. ................................. 137/549; 210/433.1; 239/112; 239/113
[58] Field of Search .................. 137/549; 210/433.1; 239/112, 113, 565

[56] References Cited

U.S. PATENT DOCUMENTS

| | | | |
|---|---|---|---|
| 2,757,800 | 8/1956 | Kucera | 210/433.1 X |
| 3,129,891 | 4/1964 | Vdoviak | 239/453 |
| 3,154,095 | 10/1964 | Cleminshaw et al. | 239/413 X |
| 3,794,179 | 2/1974 | Doucet | 210/433.1 X |
| 4,491,272 | 1/1985 | Bradley et al. | 239/402 |

Primary Examiner—Alan Cohan
Assistant Examiner—John A. Rivell
Attorney, Agent, or Firm—Edward J. Timmer

[57] ABSTRACT

A fuel nozzle assembly with integral valve for a gas turbine engine includes an inlet fitting with a tubular wash-type fuel filter therein between a central fuel passage and an annular primary fuel manifold therearound to filter primary fuel flowing through the passage to the annular primary fuel manifold chamber on the inlet fitting. The manifold chamber is in fuel flow relation in the valve housing with a primary fuel take-off passage therein for providing primary fuel flow to a fuel nozzle.

2 Claims, 2 Drawing Figures

FUEL NOZZLE ASSEMBLY WITH INTEGRAL VALVE ASSEMBLY AND INLET WASH FILTER AND PRIMARY FUEL TAKE-OFF

FIELD OF THE INVENTION

The present invention relates to fluid valve assemblies, especially fuel flow control assemblies with a wash type fuel filter for filtering fuel flow to a nozzle in a gas turbine engine.

BACKGROUND OF THE INVENTION

U.S. Pat. No. 3,129,891 issued Apr. 21, 1964, discloses a fuel nozzle assembly having primary and secondary fuel flow paths with a metering valve in the secondary flow path. A tubular fuel filter is employed to filter fuel flowing to the secondary metering valve while vortex action in an outer concentric swirl chamber in combination with outer circumferential dirt entrapping is used to prevent passage of major size dirt particles to the nozzle tip.

U.S. Pat. No. 3,443,760 issued to Simmons illustrates a fuel nozzle assembly having a fuel strainer for fuel flowing to a secondary metering valve. U.S. Pat. Nos. 3,022,954 to Davies; 3,154,095 to Cleminshaw and 2,954,172 to Grundman illustrate filter and metering valve arrangements.

U.S. Pat No. 4,491,272 issued to Jerome R. Bradley et al of common assignee shows a fuel valve assembly in which a stationary tubular fuel filter between a check valve and metering valve in a main valve housing filters fuel flow to a primary fuel flow path and is washed by fuel flow discharging from an upstream check valve when both primary and secondary fuel are flowing.

SUMMARY OF THE INVENTION

The present invention contemplates in a typical working embodiment a fuel valve assembly having a fuel inlet means for supplying fuel to a secondary fuel metering valve in a valve housing wherein the fuel inlet means includes a wash-type tubular fuel filter therein overlying an annular primary fuel manifold on the inlet means for filtering fuel flowing to primary fuel passages. Typically, the inlet means comprises a tubular inlet fitting with a central longitudinal fuel flow passage or bore in fuel flow relation with an annular primary fuel manifold chamber on the fitting with the tubular fuel filter located in the bore between the bore and manifold chamber to filter primary fuel before it flows into the manifold chamber. The manifold chamber is in fuel flow relation with a primary fuel take-off passage in the valve housing for providing a set or fixed non-valved primary fuel flow to a fuel nozzle. When fuel flow is increased the result is that both primary and secondary fuel systems are flowing, and foreign matter on the tubular fuel filter is washed therefrom by fuel flow through the bore and discharges through the secondary fuel flow path of the fuel valve assembly which is sized to accommodate same.

DESCRIPTION OF PREFERRED EMBODIMENTS

Figure 1:
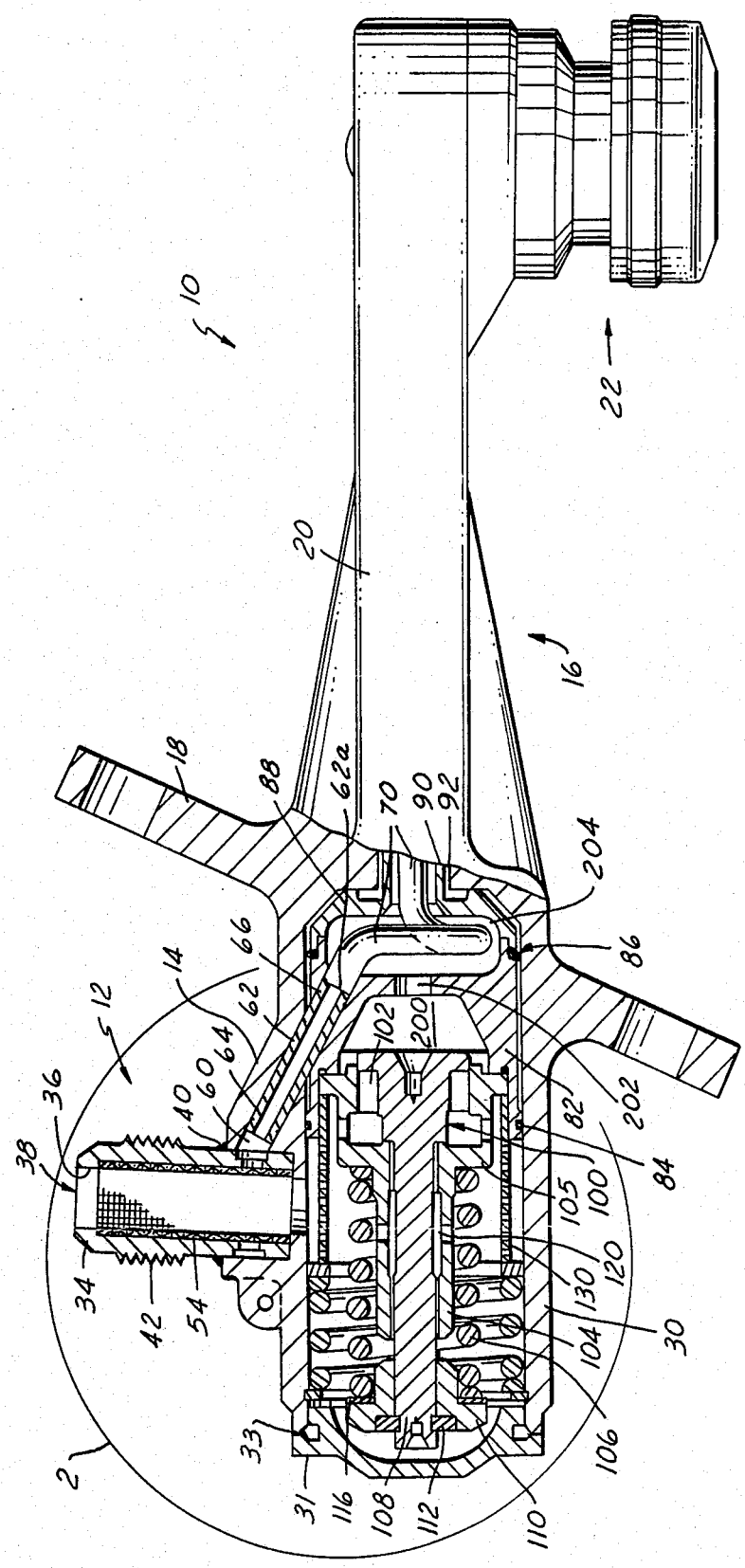
FIG. 1 is a partial cross-sectional view of a fuel valve assembly of the invention.

FIG. 1 illustrates a fuel nozzle assembly 10 constructed to have an integral fuel valve assembly 12 in accordance with the invention in a valve housing 14, a support assembly 16 with a mounting flange 18 and strut 20, and a nozzle assembly 22 for discharging fuel into the combustor of a gas turbine engine as is well known. Mounting flange 18 is secured by bolts or other means to the combustor case or duct (not shown) of the gas turbine engine also as is well known.

Figure 2:
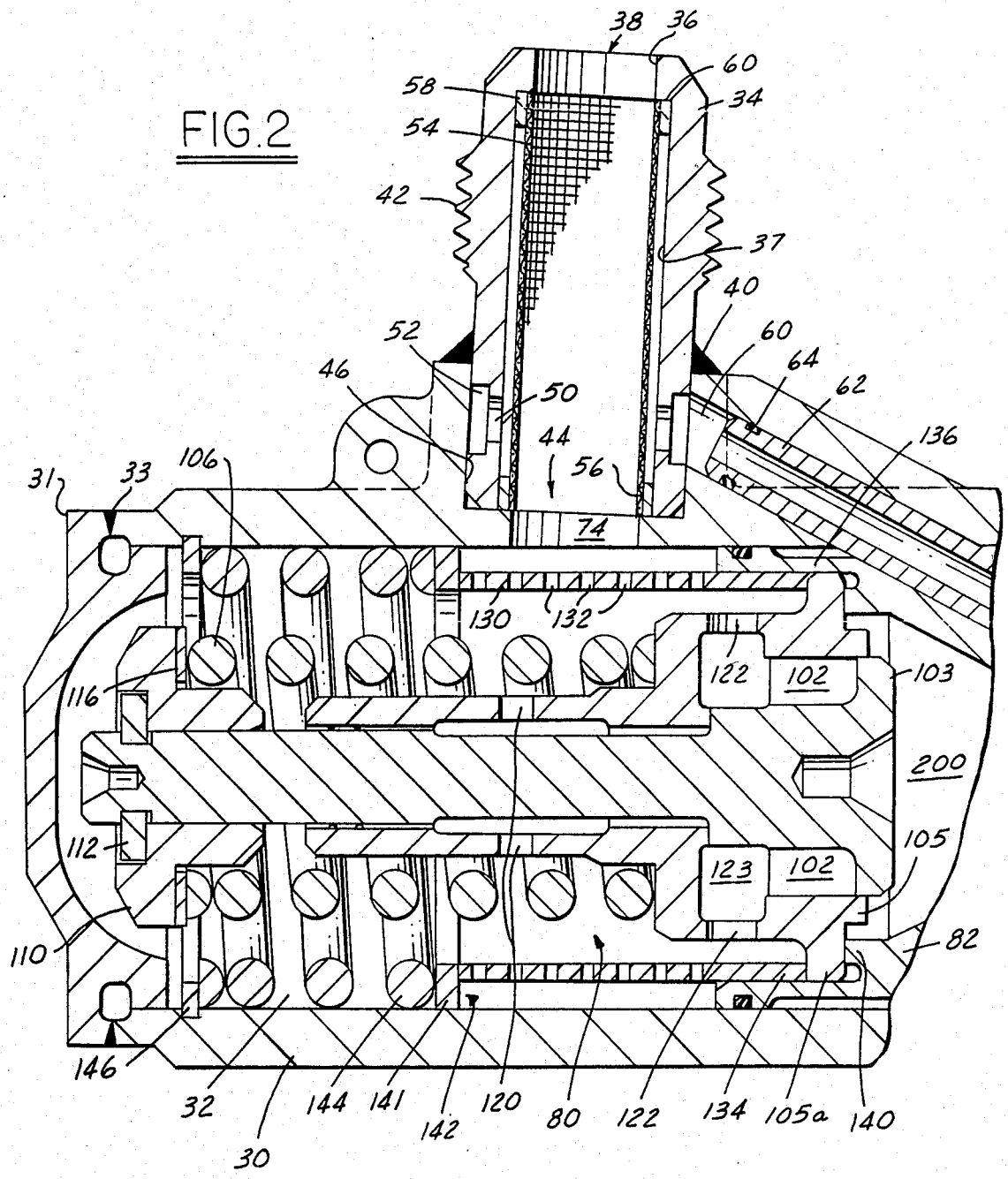
FIG. 2 is an enlarged cross-sectional view of the inlet fitting of the fuel valve assembly and primary fuel flow path therein.

As shown best in FIG. 2, the fuel valve assembly 12 includes a valve housing 30 with an elongate internal chamber 32, a housing cap 31 welded to the housing at 33 and a tubular cylindrical fuel inlet fitting 34 with a central longitudinal cylindrical fuel passage or bore 36 connected at open end 38 to a source of pressurized fuel. As shown at 40, the inlet fitting is electron-beam welded to the valve housing 30. End 38 of the inlet fitting includes a threaded portion 42 adapted for threaded coupling to a threaded coupling (not shown) of a fuel supply conduit as is known.

Open end 44 of the inlet fitting is received in a counterbore 46 of valve housing 30 and adjacent that end, annular first and second primary fuel manifold chambers 50,52 are machined or otherwise provided on the outer circumference of the inlet fitting.

A tubular cylindrical wash-type primary fuel filter 54 having support rings 56,58 attached thereto as by brazing is located concentrically in the enlarged passage 37 as shown with the upstream support ring 58 abutted against a radial shoulder 60 adjacent open upstream end 38 of the fuel passage and with downstream support ring 56 abutted against the bottom of the counterbore 46 of the valve housing. The primary fuel filter 54 is typically a type 347 stainless steel 105 mesh filter. It is apparent that the filter 54 is located between the fuel supply passage and annular primary fuel manifold chamber 50,52, overlying the latter, so that primary fuel, which has a substantially constant or fixed flow rate and is non-valved, flows through the filter and then into the manifold chamber for removal of dirt or other foreign matter that could clog the downstream primary fuel flow conduits and paths and adversely affect operation of the valve assembly.

Outer manifold chamber 52 is shown in fuel flow relation with oblique fuel passage 60 in valve housing 14 in which is disposed an adapter tube 62. Adapter tube 62 is brazed at 64,66 to the valve housing and at its downstream end 62a is in fuel flow relation with primary fuel delivery tube or conduit 70 which is brazed to the valve housing adjacent tube 62 and extends through the strut 20 to the fuel nozzle 22 to deliver fuel to the primary fuel discharge passage and orifice (not shown) of the nozzle as is known for injection into the combustor.

As is apparent, open downstream end 44 of the inlet fitting fuel passage 36 is in fuel flow relation with internal chamber 32 of the valve housing via fuel passage 74 in the valve housing. Disposed in the chamber 32 is a secondary fuel metering valve assembly 80. The metering valve assembly includes a first valve support body 82 brazed at 84 to the valve housing and at 86 to a cup-shaped second valve support body 88 which rests on the bottom of the chamber 32 and includes a large diameter secondary fuel tube extension 90 extending through a passage 92 in strut 20 with smaller diameter primary fuel tube 70 extending therethrough as shown.

A metering valve 100 with multiple metering slots 102 is slidably supported in upper tubular guide extension 104 of valve body 105 which is clamped fixedly in position in chamber 32 as described herebelow. A compression type spring 106 biases the metering valve in the upward or closed direction. The metering valve stem 108 received in guide extension 104 has an end cap 110 held thereon by retainer-ring 112 and coil spring 106 has one end abutted against valve shim 116 for adjusting valve cracking pressure.

Tubular guide extension 104 includes upstream transverse fuel access apertures 120 and downstream transverse fuel access apertures 122 through which secondary fuel in chamber 32 can flow into metering slots 102 via annular fuel manifold chamber 123. As is apparent, fuel flows through apertures 120 when the valve head 103 moves open from the adjacent valve seat.

A tubular cylindrical secondary fuel strainer 130 with multiple strainer apertures 132 is disposed concentrically in chamber 32 around the guide extension 104 and includes a downstream end 134 nested or received in the bore 136 of the valve support body 82 as shown with a radial circumferential shoulder 105a on the valve body 105 clamped between end 134 and an annular lip 140 on the valve support body 82. The upstream end 142 of the secondary fuel filter is biased by coil spring 144 located between retainer ring 146 and support ring 148 as shown so that the spring bias clamps the valve body 105 in position.

Valve spring 106 is adjusted to permit opening of the metering valve 100 at a preselected fuel pressure as is known. Pressurized fuel entering chamber 32 from the inlet fitting 34 first passes through the secondary fuel strainer apertures 132 which are sized to prevent foreign matter of certain relatively large size from entering and clogging the secondary fuel flow path downstream therefrom.

Secondary fuel passing strainer apertures 132 flows to metering slots 102 and, if the metering valve is open, into secondary fuel chamber 200, around primary fuel tube 70 through fuel trimming orifice 202 and into secondary fuel discharge chamber 204. From chamber 204, the metered secondary fuel flows through tube extension 90 of the second valve support body 88 around primary fuel tube 70 and through strut 20 to the nozzle 22 for discharge into the combustor.

When fuel pressure reaches and exceeds the selected value for opening metering valve 100, total fuel flow through the fuel passage 36 in the inlet fitting 34 and filter 54 is greatly increased and tends to wash debris and other foreign matter from the primary fuel filter 54 and carry same through the secondary fuel flow path of such a size to accommodate and discharge the foreign matter without harmful clogging.

Although certain preferred features of the invention have been described hereinabove and illustrated in the Figures, it is to be understood that modifications and changes may be made therein without departing from the spirit and scope of the invention as defined in the appended claims.

We claim:

1. In a fuel valve assembly for providing an unvalved primary fuel flow and metered secondary fuel flow to nozzle means, the combination of a valve housing with an internal chamber, a tubular fuel inlet fitting extending transversely from the valve housing, said inlet fitting having a wall forming a longitudinal fuel supply passage therein in fuel flow communication with the internal chamber for supplying secondary fuel flow thereto and an annular primary fuel manifold chamber in the wall extending from the fuel supply passage through said wall, said valve housing including a portion around the inlet fitting closing off the manifold chamber except for a primary fuel passage in said valve housing for supplying primary fuel flow to said nozzle means and tubular fuel filter means in the fuel supply passage between said fuel supply passage and primary fuel manifold chamber for filtering primary fuel flow thereto and subject to washing action by fuel flow when secondary fuel flows through the fuel supply passage.

2. The fuel valve assembly of claim 1 wherein the primary fuel passage extends obliquely in the valve housing relative to the inlet fitting and internal chamber.

* * * * *